Dec. 7, 1926.  
J. R. GAMMETER  
1,609,620  
METHOD AND APPARATUS FOR MAKING TIRE BANDS  
Filed March 5, 1924   2 Sheets-Sheet 2
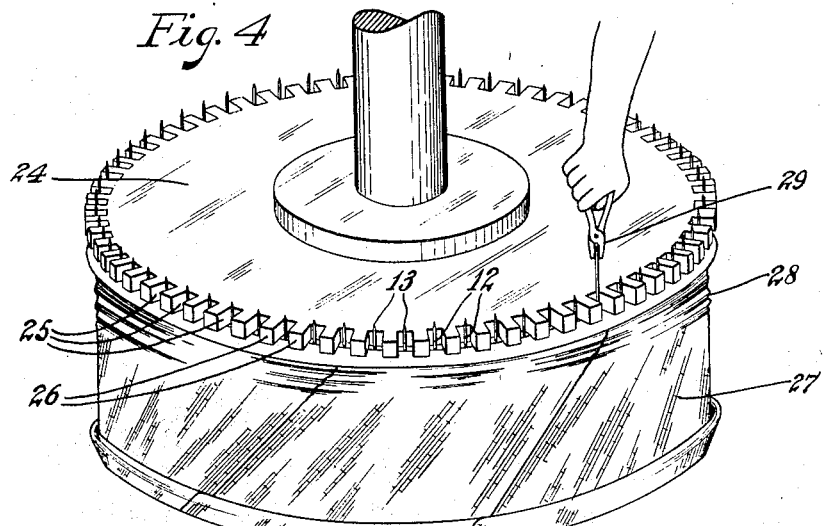
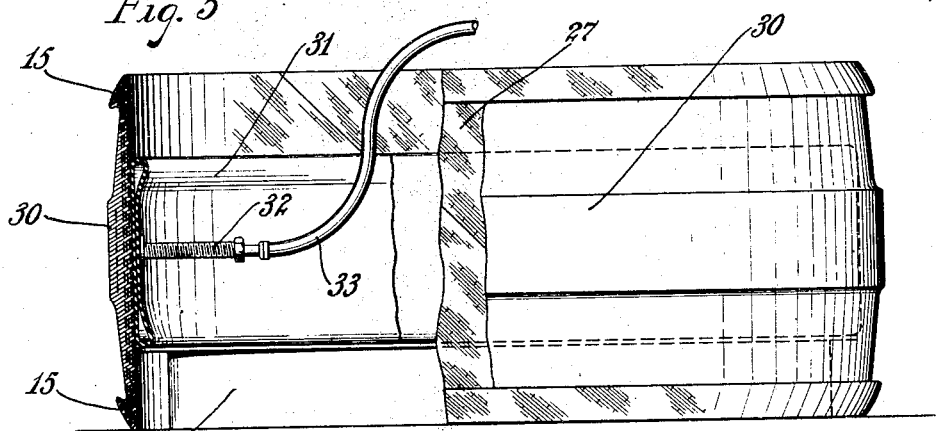
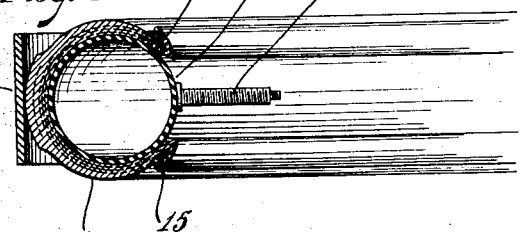
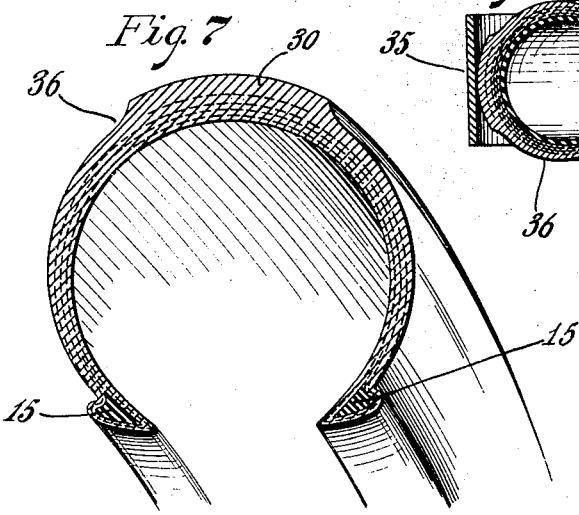
Inventor  
John R. Gammeter.  
By Robert M. Pinson  
Atty.

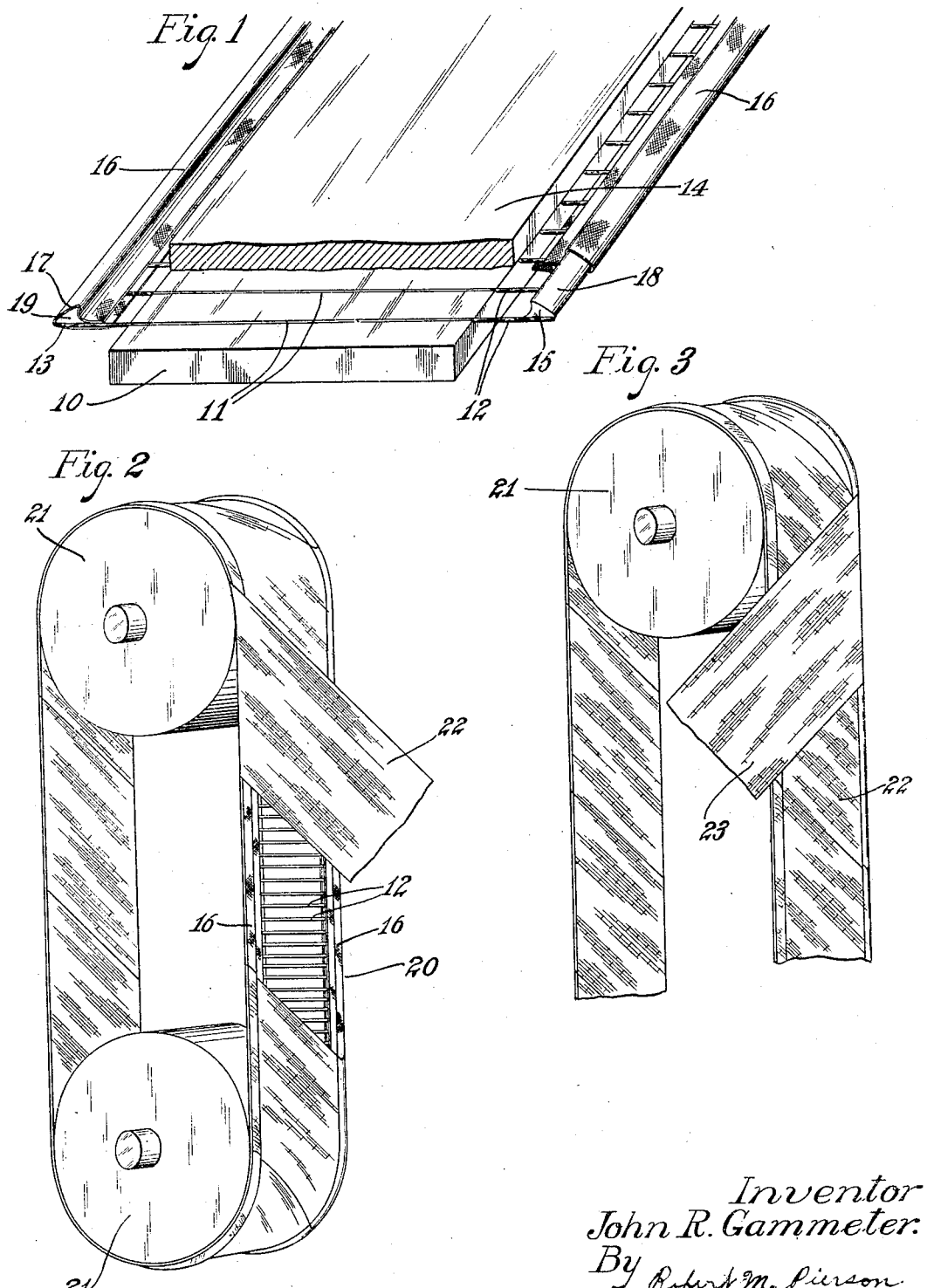

Patented Dec. 7, 1926.

1,609,620

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING TIRE BANDS.

Application filed March 5, 1924. Serial No. 697,020.

This invention relates to the art of making endless tire bands for the building of pneumatic tires, and is of especial value in making endless tire bands of weftless or weak wefted cord or thread fabric having layers of cords which run obliquely from edge to edge of the band, the threads of one layer crossing those of another.

My chief objects are to provide an improved tire band having its threads continuous from one ply to another, with annular bead members embraced between such plies if desired, and to provide an improved and simple method, requiring but little apparatus, for making such bands. A further object is to provide simple and inexpensive apparatus for carrying out certain steps of the method.

In practicing my method in its preferred form, a pair of bead-core strips each equal in length to the bead-circumference of a tire are made endless by splicing and are held in parallel relation, spaced apart a distance substantially equal to the width of the tire band to be constructed, while a strip of fabric is wound helically thereon, the winding progressing circumferentially about the pair of annular beads, the pitch of the winding and the width of the fabric being so correlated with the spacing of the beads as to cause successive wraps to lie in substantially abutted, edge-to-edge relation, the cords of the two plies thus laid crossing each other. When additional plies are wound on, the direction of the winding preferably is reversed, so that the cords of adjacent plies, throughout the structure, will cross each other.

Of the accompanying drawings:

Fig. 1 is a fragmentary, sectional, perspective view of apparatus embodying and adapted to carry out certain steps of my invention in its preferred form, with the work thereon.

Fig. 2 is a perspective view of apparatus adapted to carry out a later step of the method, and the work in place thereon.

Fig. 3 is a similar, fragmentary perspective view of the same, showing a still later stage of the method.

Fig. 4 is a perspective view of apparatus and work at a still later stage.

Fig. 5 is an elevation, partly broken away and in section, of a tire-band constructed in accordance with my invention also showing diagrammatically a well known instrumentality for expanding a flat tire-band to tire-shape.

Fig. 6 is a fragmentary elevation, partly in section, of the tire-band after it is expanded to tire shape, also showing diagrammatically instrumentalities which may be used in such operation.

Fig. 7 is a sectional perspective view of the completed tire.

Referring to the drawings, the apparatus for carrying out the first step of my process comprises a lower rectangular plate 10 of a length slightly longer than the circumference of a tire of the size to be built and of a width considerably less than the cross-sectional circumference of such tire. The plate 10 has formed in its upper surface a series of spaced, parallel grooves 11, 11, extending from edge to edge, transversely thereof, and preferably equally spaced lengthwise of the plate. Said grooves 11 are adapted to receive a set of spacing members or "needles" 12, 12, each of the same being of a length substantially equal to the cross-sectional circumference of the tire, which is to say the width of the tire band to be formed, and each having a pointed end as indicated at 13, 13, (see especially Fig. 4). For retaining the needles 12 in the grooves 10, an upper, rectangular, smooth-surfaced plate 14, preferably of about the same dimensions as plate 10, is placed on the upper surface of plate 10, bearing upon the needles.

In carrying out the first step of the process, the set of needles 12 are arranged in the grooves 11 of plate 10 so as to extend an equal distance on either side of the plate and with their points 13 all on one side of the plate. The plate 14 is then mounted on the upper surface of plate 10 so as to retain the needles 12 in the grooves 11. A pair of strips of bead-material 15, 15, in length equal to the circumference of the tire, are then laid upon the outer edges of the row of needles 12 and secured thereto by strips of adhesive, rubberized fabric 16, 16, as shown clearly in Fig. 1, the margins of said strips being pressed adhesively against each other between the needles. The fabric strips 16 are of the same length as the bead strips, but are so secured as to project beyond each bead strip at one end, as indicated at 17, (Fig. 1) leaving a portion of the bead exposed at the other end, as indicated at 18, to provide for the subsequent splicing of the beads by inserting the exposed end such as 18 into the space within the projecting end of the fabric strip, such a space being shown at 19. The upper plate 14 is then removed, the structure comprising the needles 12, the beads 15 and the fabric strips 16 are lifted from the plate 10 and its ends spliced together as described, providing an endless, skeleton structure adapted for the winding of the tire fabric thereonto.

Referring to Fig. 2, the endless, skeleton structure, as described above, and designated 20 in Fig. 2, is mounted upon a pair of spaced, rotatably mounted drums 21, 21 by which the band structure 20 may be driven, by hand or otherwise, during the plying-up or fabric-winding process, the drums being so arranged as to hold the band taut.

The band structure 20 is then driven, upon the drums 21, and a strip of straight-laid tire fabric 22, preferably weak-wefted or weftless, is wrapped helically about the skeleton structure so that successive convolutions substantially abut each other, forming a tubular or two-ply, annular band of fabric, enclosing the annular skeleton structure. The fabric may be stitched or pressed in place about the beads, against one of the drums, by hand or in any known or suitable manner, during the wrapping operation. As shown in Fig. 3, a second ply of fabric 23 is then wound reversely about the band structure, if a band of more than two plies is desired, so that the cords in the second wrapping will cross those of the first. Successive, alternatingly reversed wrappings are thus applied and pressed about the beads until the desired number of plies are in place, after which the needles are removed, leaving a completely formed, transversely flat, tire band.

For removing the needles from the wrapped band-structure, the apparatus shown in Fig. 4 is provided. This apparatus comprises a pressing device, including a disc-shaped pressing element 24, of a diameter somewhat larger than the diameter of the band, having a series of notches 25, 25 cut from its outer periphery, said notches being spaced apart so as to register with the needles in the band-structure, and the portions 26 of the pressing element 24 between the notches 25 being adapted to press the edge of the band between the needles and thus cause the points of the latter to emerge from the band and project through the notches 25 so that they may be grasped and the needles thus removed from the band.

In carrying out this part of my process, the wrapped band-structure, designated 27, is supported on edge, as shown in Fig. 4, with the pointed ends of the needles uppermost, and the pressing element 24 is applied to the upper bead in proper registry with the needles, whose positions in the band structure may readily be detected by the bulging of the fabric thereof. The element 24 being thus applied and pressed downward so as to cause the needles to project, the latter are removed by gripping their pointed end portions 13 and pulling from the tire-band, which operation readily may be accomplished by the use of pliers, shown at 29. The tread 30 (Fig. 5) may then be applied in any suitable manner, to complete the flat tire-band.

The flat tire-band is then expanded to tire-shape in any known or suitable manner, an expansible annular bag such as heretofore has been used for this purpose, usually with an interior support (not shown) being shown at 31. A gauge member such as is shown at 34, may be used for positioning the tire-band with relation to the expansible bag, but the particular means used for expanding the band is not an essential feature of my invention, and various types of apparatus adapted for this operation are well known. Means such as the ring 35 (Fig. 6) may be used for limiting the expansion of the tire, which is shown in its final form at 36 in Figs. 6 and 7.

The process may be varied in numerous ways without departing from the spirit of the invention. It is not wholly limited, for example, to tires of the soft bead or extensible bead type, nor is it wholly limited to making the skeleton structure endless before winding the fabric thereon.

I claim:

1. The method of making a tire band which comprises arranging a plurality of rods in spaced relation, securing the respective ends of said rods to a pair of bead cores in overlapped relation, forming the assembled bead cores and spacers into an annular skeleton structure, winding tire-building material onto said skeleton structure, pressing the bead cores one toward the other to cause ends of the rods to protrude through the tire-building material, and withdrawing the rods from the structure by engagement with their protruding end portions.

2. The method of making a tire-band which comprises forming an annular skeleton structure comprising a pair of annular bead cores spaced apart in parallel relation by a series of transversely disposed, pointed, needle-like spacing members, winding a strip of tire-building material onto said skeleton structure, causing the points of said needle-like members to protrude through the winding of tire building material by pressing the latter adjacent the points of said members, and withdrawing said members from the structure by engagement with their protruding end portions.

3. The method of making a tire band which comprises wrapping a pair of beads each with a tacky cover, spacing said beads by inserting the respective ends of a plurality of equal-length rods between the cover and bead core of each of the said pair, winding tire-building material about said spaced beads, forcing the rod ends through one of said bead covers and through the said material, and withdrawing the rods by engagement with their protruding end portions.

4. Apparatus for making tire-bands, said apparatus comprising a set of slender, pointed spacing members adapted to be secured at their respective ends to a pair of bead cores for holding the latter spaced apart in parallel relation and means for detachably supporting said spacing members in position, as a transversely disposed, aligned series, for assembly with said bead cores.

5. Apparatus for making tire-bands, said apparatus comprising a set of spacing members adapted to be secured at their respective ends to a pair of bead cores for holding the latter spaced apart in parallel relation while a strip of tire-building material is wound thereon and to be removed from the resulting structure through the winding of tire-building material, and means for detachably supporting said spacing members in position, as a transversely disposed, aligned series, for assembly with said bead cores.

6. Apparatus for making tire bands, said apparatus comprising a set of slender, pointed, spacing members adapted to be secured at their respective ends to a pair of bead cores for holding the latter spaced apart in parallel relation for the winding of a strip of tire-building material thereon, and means for so pressing said winding between the points of said members as to cause the latter to protrude from said winding.

7. Apparatus for making tire bands, said apparatus comprising a set of slender, pointed, spacing members adapted to be secured at their respective ends to a pair of bead cores for holding the latter spaced apart in parallel relation for the winding of a strip of tire-building material thereon, and means for so pressing said winding between the points of said members as to cause the latter to protrude from said winding, said means comprising a rigid disk-like member formed with recesses to receive the protruding ends of said members.

In witness whereof I have hereunto set my hand this 29th day of February, 1924.

JOHN R. GAMMETER.